United States Patent
Yoon

(10) Patent No.: US 9,429,200 B2
(45) Date of Patent: Aug. 30, 2016

(54) DCT CONTROL METHOD IN CASE OF FAILURE OF WHEEL SPEED SENSOR

(71) Applicants: Hyundai Motor Company, Seoul (KR); Kia Motors Corp., Seoul (KR)

(72) Inventor: Young Min Yoon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 59 days.

(21) Appl. No.: 14/272,031

(22) Filed: May 7, 2014

(65) Prior Publication Data

US 2015/0105217 A1    Apr. 16, 2015

(30) Foreign Application Priority Data

Oct. 16, 2013   (KR) .................. 10-2013-0123658

(51) Int. Cl.
*F16H 61/00*    (2006.01)
*F16D 48/06*    (2006.01)

(52) U.S. Cl.
CPC ..... *F16D 48/062* (2013.01); *F16D 2500/3026* (2013.01); *F16D 2500/30401* (2013.01); *F16D 2500/30816* (2013.01); *F16D 2500/3115* (2013.01); *F16D 2500/5102* (2013.01); *F16D 2500/5112* (2013.01); *F16D 2500/5114* (2013.01); *F16D 2500/7041* (2013.01); *Y10T 477/6414* (2015.01)

(58) Field of Classification Search
CPC . F16H 61/12; F16H 61/1208; F16H 61/1216
See application file for complete search history.

(56) References Cited

U.S. PATENT DOCUMENTS

| | | | |
|---|---|---|---|
| 2005/0090370 A1* | 4/2005 | Berger | B60K 6/48 477/167 |
| 2010/0241325 A1* | 9/2010 | Glatthaar | F16H 61/682 701/58 |
| 2010/0318271 A1* | 12/2010 | Nishide | F16H 61/12 701/62 |
| 2014/0288787 A1* | 9/2014 | Hyodo | B60W 10/02 701/48 |

FOREIGN PATENT DOCUMENTS

| | | |
|---|---|---|
| JP | 9-144871 A | 6/1997 |
| JP | 2008-151194 A | 7/2008 |
| JP | 2013-79702 A | 5/2013 |
| JP | 2013-83330 A | 5/2013 |
| KR | 10-2006-0054167 A | 5/2006 |
| KR | 10-2010-0138534 A | 12/2010 |
| KR | 10-2012-0077737 A | 7/2012 |

* cited by examiner

*Primary Examiner* — Tisha Lewis
(74) *Attorney, Agent, or Firm* — Morgan, Lewis & Bockius LLP

(57) ABSTRACT

A dual clutch transmission (DCT) control method for a vehicle mounted with a DCT, which is not provided with an output shaft speed sensor, when a wheel speed sensor has failed, or the information cannot be controlled in a situation where shift gears are not coupled, properly couples the shift gears while preventing a clutch burst, and thus a controller can control DCT by calculating an output shaft speed of DCT.

5 Claims, 2 Drawing Sheets

FIG. 2

| SHIFT RANGE | ORDER | ODD NUMBER SIDE | EVEN NUMBER SDIE | |
|---|---|---|---|---|
| P | NO. 1 | 7 | N | ← S30 |
| | NO. 2 | 7 | R | ⎫ S50 |
| | NO. 3 | 1 | R | ⎭ |

DCT CONTROL METHOD IN CASE OF FAILURE OF WHEEL SPEED SENSOR

CROSS-REFERENCE TO RELATED APPLICATION

The present application claims priority of Korean Patent Application Number 10-2013-0123658 filed Oct. 16, 2013, the entire contents of which application is incorporated herein for all purposes by this reference.

BACKGROUND OF INVENTION

1. Field of Invention

The present invention relates to a control method of dual clutch transmission (DCT), and more particularly, to a method of coupling shift gears of DCT in a situation where a wheel speed sensor of a vehicle has failed.

2. Description of Related Art

Generally, an output speed of DCT is calculated reversely using a wheel speed sensor of a vehicle to control DCT in a vehicle mounted with DCT, which is not provided with a speed sensor for an output shaft.

Meanwhile, in case where a wheel speed sensor has failed, or a controller of DCT does not know the information of the failure, an output speed of a transmission is used, which is calculated using the speed of an input shaft to which the currently coupled shift gears is connected. Of course, here an input shaft speed sensor has to be provided for measuring the rotation speeds of the two input shafts of DCT. However, the controller does not know an output speed of DCT and a vehicle speed in a situation where the shift gears are not coupled.

Of course, when the shift gears are coupled in the situation as described in the forgoing, the output speed of a transmission can be calculated using the input shaft speed to solve the problem, however, when the incorrect shift gears, not corresponding to a driving situation of a vehicle are coupled while a vehicle drives, it produces a clutch burst where the speed of the clutch increases abruptly, thereby causing a failure.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to solve the problems of the related art.

Various aspects of the present invention provide for a dual clutch transmission (DCT) control method in case of failure of a wheel speed sensor, in which in a vehicle mounted with DCT, which is not provided with a speed sensor for an output shaft, when a wheel speed sensor fails or the information thereof cannot be controlled under the shift gears being not coupled, the shift gears are coupled properly while preventing a clutch burst and thus a controller can control DCT by calculating an output shaft speed of DCT.

The DCT control method in case of failure of a wheel speed sensor may include: a sensor checking step for checking the states of a wheel speed sensor and the two input shaft speed sensors; a gear coupling confirming step for confirming whether the shift gears are coupled when the wheel speed sensor has failed and the two input shaft speed sensors are normal as a result of performing the sensor checking step; and a top stage coupling step for coupling the top stage shift gear of DCT when all shift gears of DCT are not coupled as result of performing the gear coupling confirming step.

The DCT control method in case of failure of a wheel speed sensor may further include: an output speed calculation step for calculating the speed of an output shaft by the signal input from the speed sensor for the input shaft after performing the top stage coupling step; and a shift stage arranging step for coupling a new shift gear proper for a driving state of a vehicle on a basis of the output speed calculated by the output speed calculation step.

In a situation right after the ignition-on of a vehicle where a P range is selected, the top stage shift gear related to the odd number side input shaft may be coupled in the top stage coupling step; the output speed calculation step is performed; and when it is confirmed that a vehicle is stopped in the output speed calculation step, the R stage shift gear related to the even number side input shaft is coupled and then the $1^{st}$ stage shift gear related to the odd number side input shaft is coupled in the shift stage arranging step.

In the top stage coupling step a location of a gear actuator may be controlled until the coupling of the shift gear is completed by receiving the feedback of the location of the gear actuator.

When all shift gears of DCT are not coupled under a situation where output speed of DCT is not known, the top stage shift gear of the DCT may be coupled and an output speed of DCT may be calculated through the top stage shift gear, using a speed sensor of the input shaft to be connected to the output shaft of DCT, and then a subsequent DCT may be controlled on a basis of the calculated output speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing exemplary method steps according to the present invention.

Figure 1:
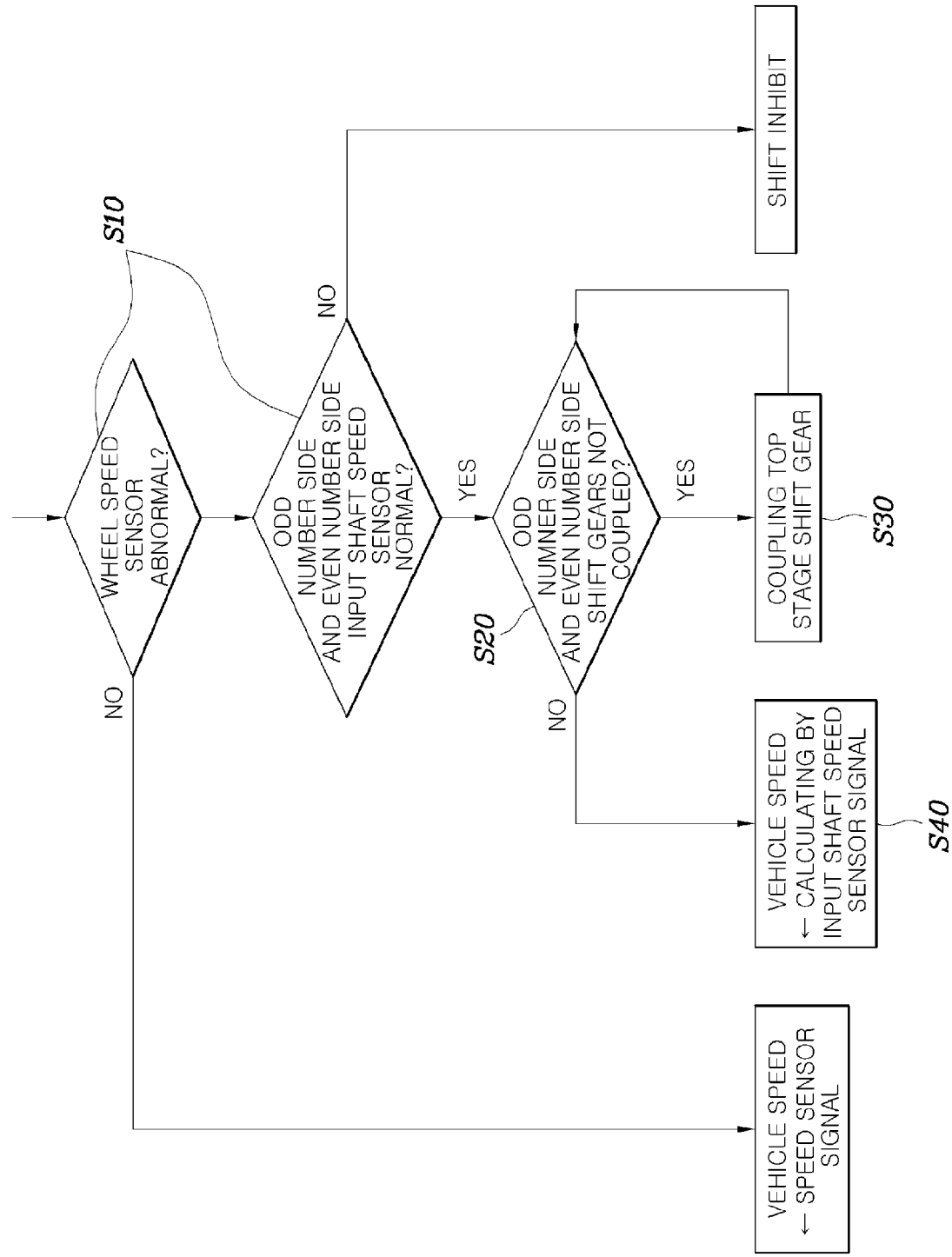
FIG. 1 is a flowchart showing an exemplary control method of a dual clutch transmission (DCT) in case of failure of a wheel speed sensor according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a control method of a dual clutch transmission (DCT) in case of failure of a wheel speed sensor may include: a sensor checking step S10 for checking the states of a wheel speed sensor and the two input shaft speed sensors; a gear coupling confirming step S20 for confirming whether the shift gears are coupled when the wheel speed sensor has failed and the speed sensors for two input shafts are normal as a result of performing the sensor checking step S10; and a top stage coupling step S30 for coupling the top stage shift gear of DCT when all shift gears of DCT are not coupled as result of performing the gear coupling confirming step S20.

That is, when all shift gears of DCT are not coupled in a situation where the output speed of DCT is not known, a controller of DCT couples the top stage shift gear of the DCT and measures a speed of the input shaft to be connected to an output shaft of DCT through the top stage shift gear, using a speed sensor of the input shaft, and then an output speed of DCT is calculated using the speed of the input shaft and the gear ratio of the currently coupled shift gear, controlling subsequently the DCT based on the calculated output speed.

In a situation where the output speed of DCT is not known due to a failure or abnormality of the wheel speed sensor, when the top stage shift gear is coupled, a clutch burst can be prevented even when a vehicle drives at a high speed, and further the speed of the output shaft is calculated through the speed sensor of the input shaft to be used in a subsequent DCT control.

That is, an output speed calculation step S40 for calculating the speed of an output shaft by the signal input from the speed sensor for the input shaft is performed after performing the top stage coupling step S30, and a shift stage arranging step S50 for coupling a new shift gear proper for a driving state of a vehicle on a basis of the output speed calculated by the output speed calculation step S40 is performed in sequence.

At this time, in the top stage coupling step S30 a location of a gear actuator is controlled until the coupling of the shift gear is completed by receiving the feedback of the location of the gear actuator. That is, when the output speed of DCT is recognized normally, the coupling of the shift gear is controlled while the input shaft speed and the output shaft speed are controlled to be synchronized, but in the top stage coupling step S30 the output shaft speed is not known and the synchronizing control cannot be performed, and thus the coupling of the shift gear is controlled through the location control of the gear actuator.

Meanwhile, as shown in FIG. 1, when it is determined that the wheel speed sensor has not failed in the sensor checking step S10, a vehicle speed and the output speed of DCT are known rightly by the signal from the wheel speed sensor as in a related art, and when it is determined that any shift gear is coupled in the gear coupling step S20, the output speed of DCT and the vehicle speed are calculated reversely using the gear ratio of the coupled shift gears and a rotational speed of the corresponding input shaft that is measured by the speed sensor of the input shaft.

Of course, when it is determined that the speed sensors for two input shafts are not normal, further shifting is impossible to control and thus the shift is inhibited.

Hereinafter, a DCT control method according to the present invention will be described as an example of DCT with a top stage of $7^{th}$ stage.

The following table 1 exhibits that a controller couples the $1^{st}$ stage related to the odd number side input shaft and the R stage related to the even number side input shaft in a P range, when the controller receives normally the information on a vehicle speed right after ignition-on of the vehicle.

TABLE 1

| Shift range | Odd number side | Even number side |
|---|---|---|
| P | 1 | R |

However, when the controller does not receive the information from the wheel speed sensor or the speed sensors of the input shafts and thus the output speed of DCT is not known in a situation right after the ignition-on of a vehicle where a P range is selected, the sensor checking step S10 and the gear coupling confirming step S20 are performed and, as shown in FIG. 2, firstly the $7^{th}$ stage shift gear of the top stage shift gear related to the odd number side input shaft is coupled eventually by performing the top stage coupling step S30.

Next, the output speed calculation step S40 is performed. At this time, in the output speed calculation step S40 a vehicle is stopped, the output shaft of DCT is stopped and the odd number side input shaft connected to the output of DCT through the $7^{th}$ stage shift gear is stopped, and the input shaft speed sensor sends a signal for informing the controller of a state where the odd number side input shaft is stopped and thus the controller confirms a state where a vehicle is stopped.

When the state where a vehicle is stopped is confirmed in the output speed calculation step S40, the R stage shift gear related to the even number side input shaft is coupled and then the $1^{st}$ stage shift gear related to the odd number side input shaft is coupled in the shift stage arranging step S50, and thus a state of DCT can be controlled as the same as a situation where a vehicle speed is known normally, as shown in Table 1.

According to the present invention, in a vehicle mounted with DCT, which is not provided with an output shaft speed sensor, when a wheel speed sensor has failed or the information cannot be controlled in a situation where the shift gears are not coupled, the shift gears are coupled properly while preventing a clutch burst and thus a controller can control DCT by calculating the output shaft speed of DCT.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual clutch transmission (DCT) control method in case of failure of a wheel speed sensor, comprising:
   a sensor checking step (S10) of checking, by a controller, states of a wheel speed sensor and two input shaft sensors;
   a gear coupling confirming step (S20) of confirming, by the controller, whether shift gears are coupled when the wheel speed sensor has failed and the two input shaft speed sensors are normal as a result of performing the sensor checking step (S10); and
   a top stage coupling step (S30) of coupling, by the controller, a top stage shift gear of the DCT using a gear actuator when all shift gears of the DCT are not coupled as result of performing the gear coupling confirming step (S20).

2. The DCT control method in case of failure of the wheel speed sensor of claim 1, further comprising:
   an output speed calculation step (S40) of calculating, by the controller, a speed of an output shaft by a signal input from at least one of the input shaft speed sensors after performing the top stage coupling step (S30); and
   a shift stage arranging step (S50) of coupling, by the controller, a new shift gear suitable for a driving state of a vehicle on a basis of the output speed calculated by performing the output speed calculation step (S40).

3. The DCT control method in case of failure of the wheel speed sensor of claim 2, wherein:
   when a P range is selected following an ignition-on of the vehicle, the top stage shift gear related to the odd number side input shaft is coupled by the controller using the gear actuator in the top stage coupling step (S30), and the output speed calculation step (S40) is performed, by the controller; and
   when it is confirmed that the vehicle is stopped in the output speed calculation step (S40), the R stage shift gear related to the even number side input shaft is coupled by the controller using the gear actuator and then the $1^{st}$ stage shift gear related to the odd number side input shaft is coupled by the controller using the gear actuator in the shift stage arranging step (S50).

4. The DCT control method in case of failure of the wheel speed sensor of claim 1, wherein in the top stage coupling step (S30), a location of the gear actuator is controlled, by the controller, until the coupling of the shift gear is completed by receiving the feedback of the location of the gear actuator.

5. A dual clutch transmission (DCT) control method in case of failure of a wheel speed sensor, comprising:
   when all shift gears of the DCT are not coupled in a situation where output speed of the DCT is not known:
   coupling, by a controller, a top stage shift gear of the corresponding DCT;
   calculating, by the controller, an output speed of the DCT through the top stage shift gear, using a speed of an input shaft to be connected to an output shaft of the DCT; and
   controlling, by the controller, a subsequent DCT on a basis of the calculated output speed.

* * * * *